Patented Sept. 2, 1924.

1,507,388

UNITED STATES PATENT OFFICE.

OSCAR H. LARSON, OF GROVE CITY, MINNESOTA.

SAW ATTACHMENT FOR TRACTORS.

Application filed February 19, 1923. Serial No. 620,111.

*To all whom it may concern:*

Be it known that I, OSCAR H. LARSON, a citizen of the United States, residing at Grove City, in the county of Meeker and State of Minnesota, have invented certain new and useful Improvements in Saw Attachments for Tractors, of which the following is a specification.

The primary object of my invention resides in the provision of saw attachment primarily, but not specifically, adapted for attachment to the Fordson tractor, the nature of the attachment being such as to derive its power from the tractor and adapted to be swung upwardly upon the front end thereof for permitting the tractor to be used for purposes originally intended.

A further object of the invention is the provision of such a saw attachment that may be readily attached to the front end of Fordson tractor in a novel and expeditious manner, the same embodying relatively few parts and this so co-related as to reduce the liability and derangement to a minimum.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 4 is a plan view of a portion of the connecting frame between the tractor axle and my saw attachment.

Figures 5 and 6 are elevational views of different forms of clamp members employed in conjunction with this invention.

Figure 1:
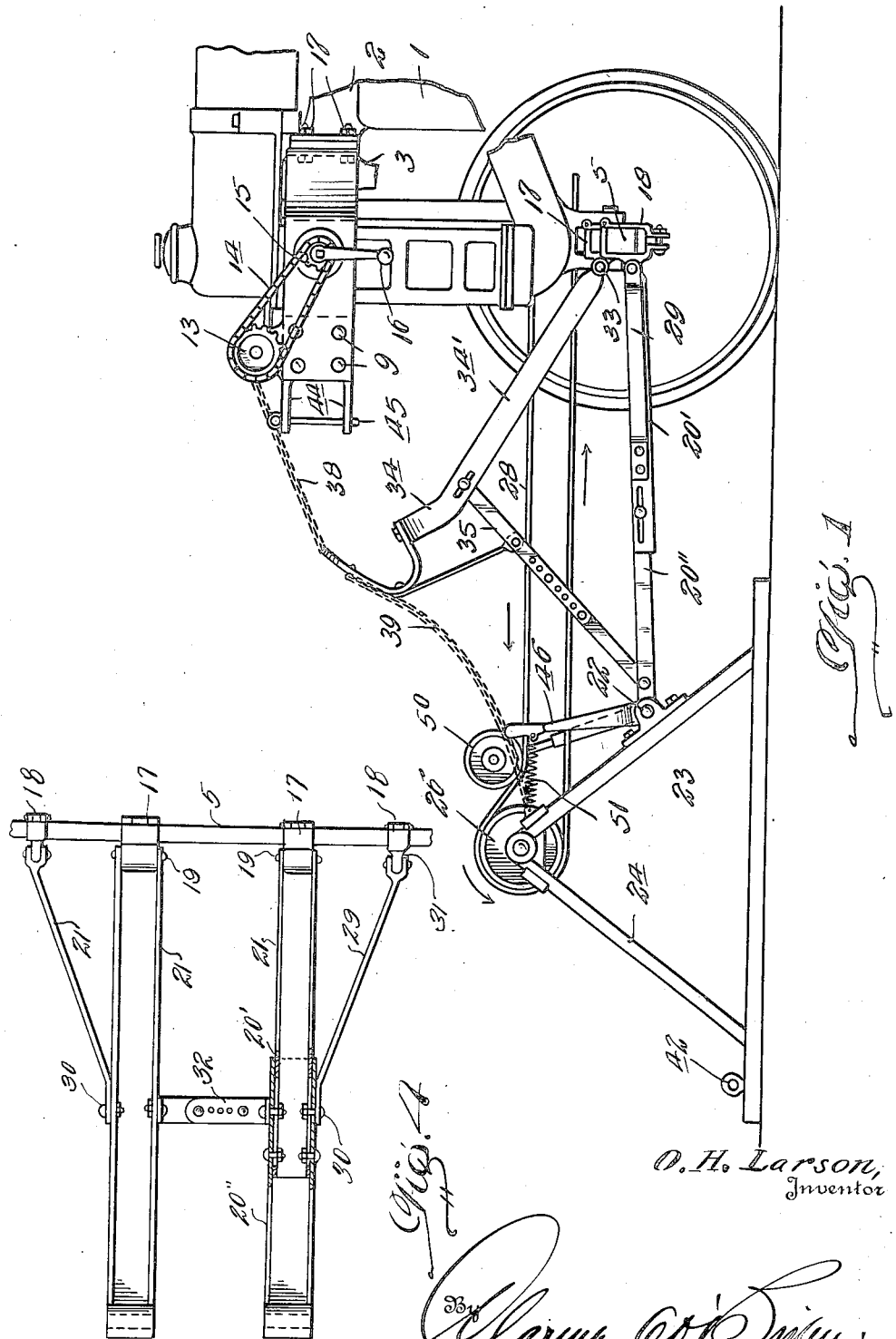
Figure 1 is a fragmentary end elevational view of the Fordson tractor showing my improved saw attachment associated therewith, the same being in a position to be employed as a saw.
Figure 2:
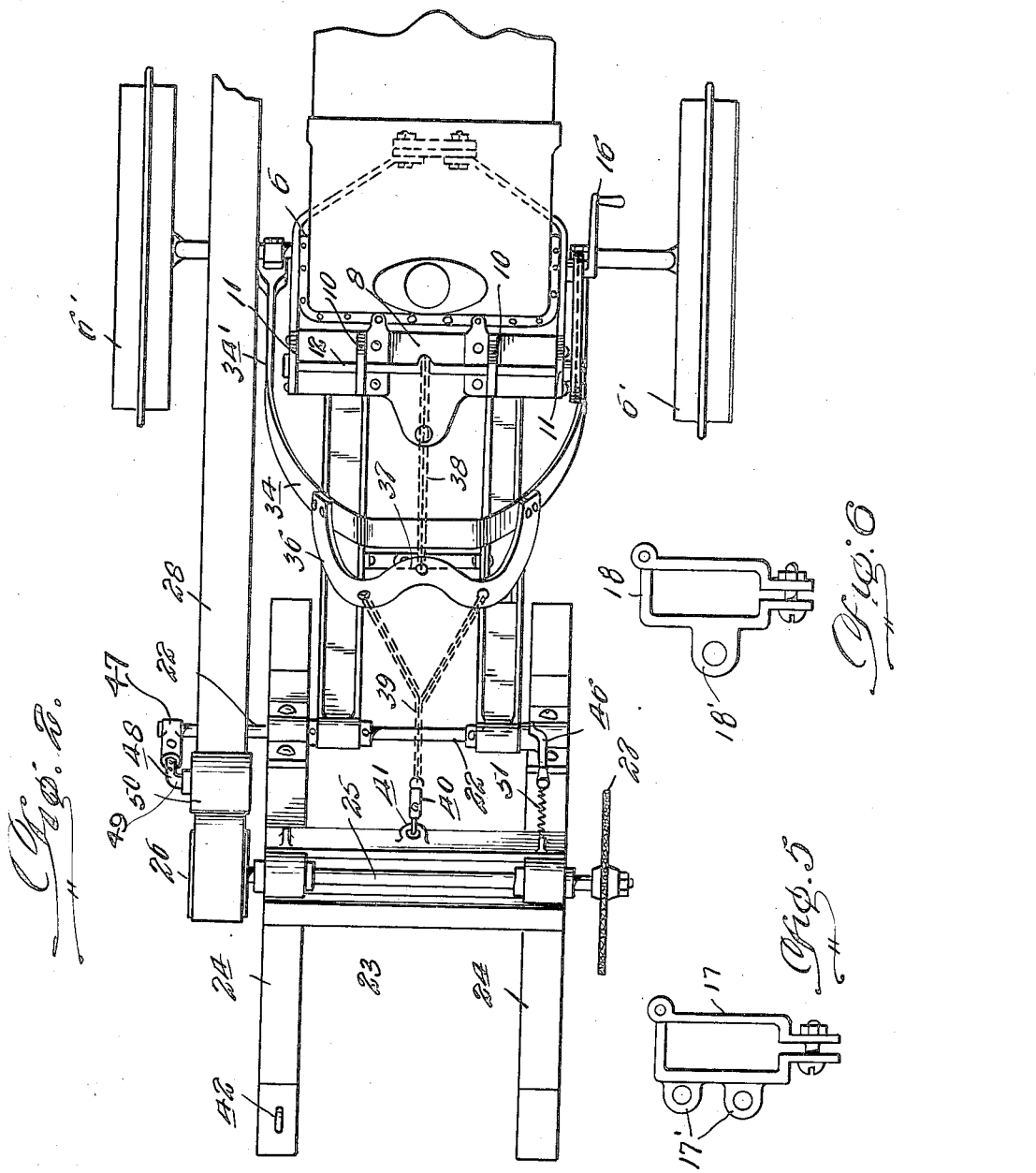
Figure 2 is a top plan view thereof.
Figure 3:
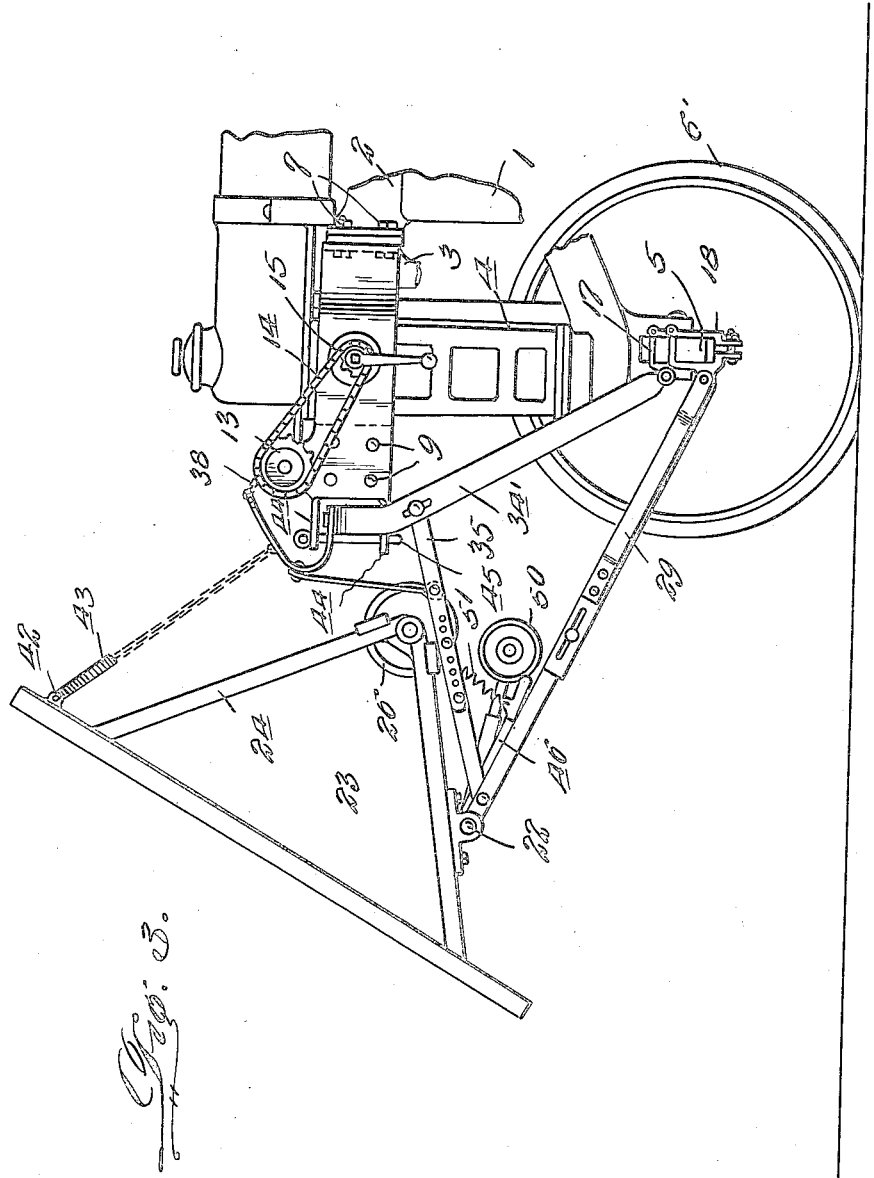
Figure 3 is a view similar to Figure 1 but showing my attachment in an upwardly swung position upon the front end of the tractor.

Referring to the drawings in detail and particularly to Figures 1, 2 and 3 I have shown the front end of a Fordson tractor embodying the motor 1, water jacket inlet 2 connected to the outlet 3 of the radiator 4, and supporting axle 5 carrying the usual steering wheel 6'.

Upon opposite sides of the radiator 4 and adjacent the upper end thereof are horizontal arms 6 the inner ends of these arms extending inwardly and being secured by the bolt connection 7 between the radiator inlet 3 and the water jacket inlet 2. These arms 6 extend forwardly of the radiator 4 and have positioned therebetween and the front ends thereof a pair of spaced plate members 8, the opposite ends of which are flanged and these flanges being riveted or otherwise secured at 9 to the said arms 6. Upon the top plate 8 there is secured a pair of spaced bearing members 10 which are in line with the raised portions 11 formed upon the upper edge of each arm 6, these raised portions as well as the bearing plates have alined openings therein for the reception of a cross shaft 12. One end of this shaft 12 carries a sprocket gear 13 around which is trained a sprocket chain 14, which extends rearwardly and is, in turn, trained over a relatively smaller sprocket gear 15 journaled in any manner desirable upon the adjacent arm 6, this gear being provided with a handle 16 for thereby rotating said shaft 12, the purpose of this construction being hereinafter set forth.

Upon the axle 5 are inner and outer pairs of clamps 17 and 18, these clamps being more clearly shown in Figures 5 and 6, it being noted that the front side of the inner clamps 17 are formed with a pair of eye members 17' while the similar sides of the outer clamps 18 are formed with but a single eye member 18'. Pivotally connected as at 19 to the lower eye member 17' of the inner clamps 17 are the inner ends of a pair of channel bars 21, the outer ends of these channel bars, in turn, being pivotally engaged with a cross shaft 22 carried by the front side of a saw frame, designated generally 23.

This frame embodies end standards 24 between the upper ends of which is journaled a shaft 25, one end of this shaft carrying a pulley 26 while the opposite end carries a circular saw blade 27. Engaging over the said pulley 26 is a drive belt 28 which extends rearwardly and is engaged over the pulley of the usual power take-off shaft of the tractor. For maintaining the shaft 25 in exact parallelism with the said power take-off shaft of the tractor for thereby preventing the belt 28 from jumping off the pulley 26, the channel bar 21 which is remote from the pulley is formed of half sections 20' and 20", respectively, which are adjustably secured together in any manner desired, but preferably by the slot and bolt connection shown in Figures 1 and 4. Brace bars 29 are provided between each channel bar 21 and the said tractor axle 5, the front ends thereof being rigidly secured to the bars as at 30, while the rear ends thereof are pivoted at 31 to the eye members 18' of the outer pair of clamps 18. An extensible connection 32 is provided between the channel bars 21 for assisting the clamps 17 and 18 in holding the bars in spaced relation to each other.

Pivotally connected at 33 to the upper eye member 17' of the clamps 17 are the legs 34' of a relatively large yoke 34, this yoke extending forwardly and upwardly as shown. Between the legs 34' of this yoke and the said channel bars 21 and preferably adjacent at the front edge of each are adjustable connecting arms 35, the lower ends thereof being pivoted between the channels of said channel bars as per Figure 8, while the upper ends thereof are connected to the legs of said yoke through a slot and pin connection shown more clearly in Figures 1 and 3.

At the front end of the yoke 34 there is secured a relatively smaller yoke 36 the central portion of which is rearwardly bent at 37. Between the rearwardly bent portion and the central point of the above described shaft 12 which is carried by the tractor is a chain 38 which is adapted to be wound above the shaft for consequently raising the saw frame to a position as shown in Figure 3. An additional chain connection 39 is provided between this yoke 36 and the saw frame 33 for preventing a pivotal movement of this frame upon the channel bars 21 while the said frame is being raised. As shown in Figure 9 the front end of this chain carries a snap hoop 40 for detachable engagement with an eye member 41 on the saw frame, this hook being detached therefrom when the frame is in a partly raised position and engaged with an eye member 42 upon the front end of the frame when the same is being forcibly swung to the position as per Figure 3. If desired a coil spring 43 may be employed in conjunction with the chain connection 39 for obvious purposes.

The before mentioned spaced plates 8 between the arms 6 at opposite sides of the tractor radiator 4, are centrally formed with forwardly extending projections 44 between which one end of the large yoke 34 extends when the saw frame is swung upwardly, the same being maintained therebetween by a pin 45 received within alined openings in the said projections.

The supporting shaft 22 of the saw frame carries adjacent one of its ends a handle 46, the other end having secured thereto a hollow arm 47 within which is adjustably secured a rod 48 having a right angularly bent end 49 upon which is a roller 50, the same being normally in close contact with the belt 28 through the instrumentality of a coil spring 51, Figure 2, for providing a belt tightener. It will, of course, be at once understood that when it is desired to swing the frame upwardly upon the tractor, this belt tightener is disengaged with the belt to the instrumentality of the said handle 46 for permitting the belt to be removed from the pulley 26.

In view of the above description it is believed that the advantages and operation of my saw attachment for tractors will be readily appreciated by those skilled in the art and although I have shown and described this saw as being primarily adapted for attachment to the Fordson type of tractor, it is nevertheless to be understood that the construction of my attachment may be so changed or modified as to adapt the same for other types of tractors.

Having described my invention, what I claim and desire by Letters-Patent, is:—

In combination with a motor vehicle, a saw attachment comprising longitudinally extensible bars pivoted to the axles of the vehicle, a yoke member pivoted at its ends to the axle of the vehicle at points above the points of pivotal connection between the said bars and the axle, longitudinally extensible arms pivotally connected at one end with the free end portions of said bar and pivotally connected at their opposite ends with the side portions of the yoke member, an upwardly and rearwardly curved strip mounted upon the yoke member, winding mechanism mounted upon the frame of the vehicle above the yoke member, a flexible element arranged to wind upon said winding mechanism and connected with the strip, a pin carried upon the frame of the vehicle and engageable with the strip to hold the yoke members and bars in an elevated position, a saw frame pivotally connected with the free ends of the bars and adapted to rest upon the ground when the bars are lowered, and means connecting the saw frame with the strip and adapted to swing the saw frame over and upon the arms when the bars and yokes are elevated.

In testimony whereof I affix my signature.

OSCAR H. LARSON.